(12) United States Patent
Kodali et al.

(10) Patent No.: US 8,029,847 B2
(45) Date of Patent: Oct. 4, 2011

(54) TRANS FAT REPLACEMENT SYSTEM AND METHOD OF MAKING A BAKED GOOD WITH A TRANS FAT REPLACEMENT SYSTEM

(75) Inventors: Dharma R. Kodali, Plymouth, MN (US); Jennifer E. Folstad, Centerville, MN (US); Michael R. Polzin, Plymouth, MN (US); Tamra R. Haese, St. Louis Park, MN (US); Venkatachalam Narayanaswamy, Mumbai (IN); Dennis A. Lonergan, Medina, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 1573 days.

(21) Appl. No.: 10/934,098

(22) Filed: Sep. 3, 2004

(65) Prior Publication Data

US 2005/0123668 A1 Jun. 9, 2005

Related U.S. Application Data

(63) Continuation-in-part of application No. 10/195,043, filed on Jul. 12, 2002, now Pat. No. 6,787,170.

(51) Int. Cl.
*A23D 9/05* (2006.01)
(52) U.S. Cl. ........ 426/603; 426/496; 426/549; 426/553; 426/555; 426/653
(58) Field of Classification Search .................. None
See application file for complete search history.

(56) References Cited

U.S. PATENT DOCUMENTS

| | | | |
|---|---|---|---|
| 4,609,555 A * | 9/1986 | Becher et al. .................. 426/94 |
| 4,810,307 A * | 3/1989 | Caton ............................ 127/63 |
| 5,360,627 A | 11/1994 | Desai et al. |
| 5,480,662 A * | 1/1996 | Boode-Boissevain et al. . 426/94 |
| 5,516,543 A | 5/1996 | Amankonah et al. |
| 5,576,043 A * | 11/1996 | Stankus et al. ................ 426/578 |
| 5,658,609 A | 8/1997 | Abboud et al. |
| 5,676,994 A | 10/1997 | Eskins et al. |
| 5,695,806 A | 12/1997 | Bateman |
| 6,048,564 A * | 4/2000 | Young et al. ................... 426/573 |
| 6,060,107 A | 5/2000 | Reddy |
| 6,149,961 A * | 11/2000 | Kepplinger et al. .......... 426/553 |
| 6,248,388 B1 * | 6/2001 | van Eendenburg et al. .. 426/556 |
| 6,495,188 B2 | 12/2002 | Mazurek et al. |
| 6,495,536 B1 | 12/2002 | Masui et al. |
| 6,579,554 B2 | 6/2003 | Moder et al. |
| 2003/0099747 A1 | 5/2003 | Eini et al. |
| 2004/0009272 A1 | 1/2004 | Lonergan et al. |
| 2004/0116382 A1 | 6/2004 | Plank et al. |

OTHER PUBLICATIONS

University of Nebraska Lincoln, Industrial Agricultural Products Center, Aug. 17, 2004.
Microcrystalline Cellulose, Aug. 17, 2004.
Microcrystalline Cellulose I.P., Aug. 17, 2004.
Oregon State, Oligosaccharide Module Objective, Jul. 21, 2004.
Grain Processing Corporation, Maltrin Maltodextrins and Corn Syrup Solids, Jul. 21, 2004.
National Starch & Chemical, Purity Gum 539, Aug. 17, 2004.
Avicel CE, FMC BioPolymer, Aug. 17, 2004.
Microcrystalline Cellulose Sancel-101, Aug. 17, 2004.
CTD, Inc. Cyclodextrin Resource, Natural Cyclodextrin's, Aug, 17, 2004.
Entrapment of volatile flavor compounds by cyclodextrins in model systems, Aug. 17, 2004.

* cited by examiner

*Primary Examiner* — Lien Tran
(74) *Attorney, Agent, or Firm* — J. Paul Haun; Arlene L. Hornilla

(57) ABSTRACT

The invention provides a trans fat replacement system that is a stable and shelf storable mixture of an edible oil and an expanded, low-density carbohydrate for use in preparing baked goods having a reduced trans fat content. Depending upon formulation and processing, the mixture can have a consistency ranging from generally granular to an almost paste-like consistency. The trans fat replacement system consists of at least one edible oil and an expanded, low-density carbohydrate having a bulk density less than about 0.4 g/cc. The trans fat replacement system can be used to reduce or eliminate the amounts of traditional fats used to make baked goods. In one representative formulation, the trans fat replacement system can take the form of a generally, paste-like mixture that is suitable for spreading and is especially useful for the preparation of laminated dough products such as biscuits and croissants.

15 Claims, No Drawings

TRANS FAT REPLACEMENT SYSTEM AND METHOD OF MAKING A BAKED GOOD WITH A TRANS FAT REPLACEMENT SYSTEM

CROSS-REFERENCES TO RELATED APPLICATIONS

The present application is a continuation-in-part application of U.S. patent application Ser. No. 10/195,043 entitled, "A FRIED TEXTURE IMPARTING GLAZE FOR A FOOD INTERMEDIATE AND METHOD OF MAKING A PRODUCT AND A PRODUCT PRODUCED THEREBY," filed Jul. 12, 2002 now U.S. Pat. No. 6,787,170 which is hereby incorporated by reference in its entirety.

FIELD OF THE INVENTION

The invention relates to a trans fat replacement system. More specifically, the invention relates to a mixture of an expanded, low density carbohydrate and at least one saturated, edible oil that forms a trans fat replacement system.

BACKGROUND OF THE INVENTION

Trans fatty acids are unsaturated fatty acids in which the hydrogen atoms of a double-bond, or unsaturation, are located on opposite sides of the molecule. The trans isomer of the fatty acid causes the carbon chain to assume a straight-chain configuration similar to that of a saturated fat. Trans fatty acids are primarily formed through the metal-catalyzed process of hydrogenation, however they have also been found to form naturally at low levels in cow's milk. By hydrogenating oils through industrial processing, hydrogen atoms are added to unsaturated sites on fatty acids, creating a larger population of saturated fats in the oil. In a partially hydrogenated oil, some of the unsaturated fatty acids remain. However, the processing causes some of the double-bonds of the unsaturated fatty acids to undergo isomerization to the trans configuration.

A number of research studies have provided evidence that the consumption of foods having saturated fats and trans fats adversely effects cholesterol levels and can lead to an increased potential for cardiovascular diseases. One method by which the trans fat levels can be reduced is to replace the use of solid saturated fats such as shortening or butter with edible oils that typically contain unsaturated fats. Suitable edible oils can include the vegetable oils such as corn, sunflower, canola and the like, the marine oils or other similar unsaturated oils. While these edible oils allow for the replacement of trans fats, the liquid nature of these edible oils can create inconvenience and difficulty in preparing baked products when compared to traditional solid fats. For example, the viscous nature of liquid, edible oils makes it difficult to spread and retain the position of oil during the rolling and sheeting of laminated dough products. In addition, edible oils are subject to oxidation, which reduces the shelf life of edible oils as compared to traditional solid fats.

As such, it would be advantageous to develop a trans fat replacement system for use in baking products that overcomes the viscosity and stability problems presently associated with the use of saturated, edible oils.

SUMMARY OF THE INVENTION

A trans fat replacement system of the invention provides a composition allowing for the reduction or elimination of trans fats in baked goods. The trans fat replacement system can comprise a composition of an expanded, low-density carbohydrate and at least one edible oil. Depending upon the formulation of the trans fat replacement system, the trans fat replacement system can have a consistency ranging from generally granular-like to generally paste-like. The expanded, low-density carbohydrate can be selected from suitable expanded, low-density carbohydrates having a bulk density less than 0.4. The edible oil can be selected from any of the commonly used edible oils such as dairy oils, marine oils, fruit oils and vegetable oils. The trans fat replacement system can be formulated such that it is both shelf-storable and spreadable, for instance a paste-like consistency, for use in baking applications.

In an embodiment, the invention provides a trans fat replacement system comprising a paste-like composition of an expanded, low-density carbohydrate and an edible oil wherein the fat replacement system has a trans fat content of less than 0.5 grams per serving.

In another embodiment, the invention provides a trans fat replacement system comprising a paste-like composition of an expanded, low-density carbohydrate, an edible oil and a fat wherein the fat replacement system has a trans fat content of less than 0.5 grams per serving.

In another embodiment, the invention provides a method of preparing laminated dough products using a spreadable, shortening-like composition comprising a low density carbohydrate and an edible oil wherein the composition has a trans fat content of less than 0.5 grams per serving.

In another embodiment, the invention is directed to a trans fat replacement system comprising a mixture of a low-density maltodextrin and an edible oil such that the fat replacement system has a trans fat content of less than 0.5 grams per serving.

In another embodiment, the invention is directed to methods for preparing a baked good having a reduced trans fat level.

In another embodiment, the invention is directed to methods for preparing a baked good free of trans fats.

All percentages are by weight (wt %) unless otherwise indicated. Further embodiments of the invention, without limitation, will become apparent from the following figures, detailed description, and examples.

DETAILED DESCRIPTION OF THE PREFERRED EMBODIMENTS

In an embodiment of the invention, a trans fat replacement system comprises a composition of an expanded, low-density carbohydrate and at least one edible oil. An embodiment of the trans fat replacement system can be formulated such that the ratio of edible oil to expanded, low-density carbohydrate comprises about 1 to 1. In another alternative embodiment, the trans fat replacement system can be formulated such that the ratio of edible oil to expanded, low-density carbohydrate comprises about 4 to 1. In another alternative embodiment, the trans fat replacement system can be formulated such that the ratio of edible oil to expanded, low-density carbohydrate comprises about 6 to 1. In another alternative embodiment, the trans fat replacement system can be formulated such that the ratio of edible oil to expanded, low-density carbohydrate comprises about 10 to 1. For trans fat replacement formulations of edible oil to expanded, low-density carbohydrate of 6 to 1 or higher, the trans fat replacement system has a generally paste-like consistency. For trans fat replacement formulations of edible oil to expanded, low-density carbohydrate less than 6 to 1, the trans fat replacement system has a generally granular consistency.

The expanded, low-density carbohydrate generally comprises a long chain carbohydrate defining a random, porous structure. The long chain, random porous structure of the expanded, low-density carbohydrate results in a bulk density of less than about 0.5 g/cc. Examples of suitable expanded, low-density carbohydrates can comprise expanded dextrins, starches, celluloses, gums and other suitable carbohydrates having random porous structures with bulk densities less than about 0.5 g/cc.

In an embodiment of the invention, the expanded low-density carbohydrate comprises maltodextrin having a bulk density of about 0.05 to about 0.4 g/cc, and in particular, having a bulk density of about 0.10 to about 0.15 g/cc. Examples of suitable maltodextrins include MALTRIN® (available from Grain Processing Corporation of Muscatine, Iowa), N-ZORBIT® (available from National Starch and Chemical of Bridgewater, N.J.), and STAR-DRI® (available from Tate & Lyle of London, United Kingdom).

In another embodiment of the invention, the expanded low-density carbohydrate can comprise microcrystalline cellulose having a bulk density of about 0.05 to about 0.4 g/cc. A suitable microcrystalline cellulose includes Avicel® (available from FMC Corporation of Philadelphia, Pa.).

Alternatively, the expanded low-density carbohydrate can comprise a carbohydrate gum having a bulk density of about 0.05 to about 0.4 g/cc. A suitable carbohydrate gum includes PURITY® Gum (available from National Starch and Chemical).

The edible oil can comprise any one of a variety of saturated edible oils. Examples of such oils can include animal oils, dairy oils such as butter oil, marine oils such as fish oil, tree nut oils, fruit oils such as coconut oil, and vegetable oils such as soybean oil, corn oil, rapeseed or canola oil, copra oil, cottonseed oil, safflower oil, olive oil, sunflower oil, peanut oil, palm oil, palm kernel oil, and rice bran oil. The edible oil can comprise a single saturated edible oil or can comprise a mixture of a plurality of said saturated edible oils.

The trans fat replacement system of the invention can be formed in a number of ways. In general, mixing the edible oil with the expanded, low-density carbohydrate forms the trans fat replacement system of the invention. The expanded, low-density carbohydrate physically entraps the edible oil molecules, preventing the oil from flowing as readily. This minimizes oil flow and migration during the preparation and baking of baked goods. By minimizing oil drip, oil remains present on the surface of the baking dough during baking. Depending upon the formulation of the trans fat replacement system, the trans fat replacement system can range from a generally granular-like consistency for low ratio oil to carbohydrate formulations (for example less than 6 parts edible oil to 1 part expanded low density carbohydrate) to a generally paste-like consistency for high ratio oil to carbohydrate formulations (for example greater than 6 parts edible oil to 1 part expanded, low density carbohydrate).

In some embodiments, the expanded, low-density carbohydrate may undergo a pre-treatment step whereby the oil entrainment capacity of the expanded, low-density carbohydrate is enhanced. In one embodiment, the expanded, low-density carbohydrate can by dried by heating the expanded, low-density carbohydrate to drive off moisture. In order to prevent charring, the expanded, low-density carbohydrate can be mixed with the edible oil before heating the expanded, low-density carbohydrate. For example, the expanded, low-density carbohydrate can be dried at a temperature of about 100° C. under vacuum. In some instances, the expanded low-density carbohydrate may have entrained air pockets that is typically removed by vacuum prior to applying heat. One representative example of a dried expanded, low density carbohydrate is N-ZORBIT® which is available with a moisture content of 7.6% and an oil entrainment capability of 5 to 6 times its own weight. Upon drying to a moisture content of less than 1%, N-ZORBIT® has an oil entrainment capability of 9 times its own weight.

In another alternative embodiment, a suitable emulsifier can be added to increase the oil entrainment capability of the expanded, low-density carbohydrate. For instance, the addition of 1% by weight of distilled monoglyceride to N-ZORBIT® causes the oil entrainment ability of N-ZORBIT® to increase from 5 to 6 times its own weight up to 8 times its own weight.

The trans fat replacement system of the invention is now illustrated in greater detail by way of the following examples, though it should be understood that the invention is not to be construed as being limited thereto.

EXAMPLE 1

In an embodiment, the trans fat replacement system can be used to reduce the amount of trans fat present in a baked good. For instance, the trans fat replacement system can be used to make baked goods labelled as having a reduced trans fat content. A trans fat replacement system used in preparing baked goods having a reduced trans fat content can make use of traditional solid fats, for example, shortenings including animal fats such as lards, butter and hydrogenated vegetable oils such as margarine, albeit in lesser amounts than used in preparing current baked goods.

A formulation for reducing the amount of trans fats present in a baked good is shown in Table 1. The formulation for the trans fat replacement can be used for a typical roll in fat application such as typically used in the preparation of biscuits and croissants.

TABLE 1

Trans Fat Replacement System for Reduced Trans Fat Content

| Fat Replacement Formulation | Percentage |
|---|---|
| Maltodextrin | 15% |
| Canola Oil | 55% |
| Shortening | 25% |
| Hardstock (fully hydrogenated fat) | 5% |

Another formulation for reducing the amount of trans fats present in a baked good is shown in Table 2. The formulation for the trans fat replacement can be used for a typical roll in fat application such as typically used in the preparation of biscuits and croissants.

TABLE 2

Trans Fat Replacement System for Reduced Trans Fat Content

| Fat Replacement Formulation | Percentage |
|---|---|
| Maltodextrin | 14.5% |
| Canola Oil | 55% |
| Shortening | 24.5% |
| Hardstock (fully hydrogenated fat) | 6% |

The trans fat replacement system of the invention was used in preparing refrigerated croissants, similar to those manufacture by and available from the Pillsbury Division of General Mills, Inc., of Golden Valley, Minn. A typical croissant dough can comprise:

| Ingredient | Quantity |
| --- | --- |
| Butter or Margarine | 1.5 cups |
| Flour | 3.25 cups |
| Milk | 0.75 cups |
| Sugar | 2.0 Tbsp |
| Salt | 1.0 tsp |
| Warm Water | 0.5 cups |
| Dry Yeast | 2 packages |
| Egg Yolk | One |

The trans fat replacement system of the invention was used in the preparation and baking of a croissant. A first croissant was prepared using a formulation of the trans fat replacement system contained in Table 1. A second croissant was prepared using a formulation of the trans fat replacement system contained in Table 2. A third croissant was prepared as a control sample using a partially hydrogenated shortening. The process used to make the croissants is outlined below. This includes steps for mixing the dough, mixing the trans fat replacement system, sheeting the trans fat replacement system, sheeting the dough, canning the laminated dough product, proofing and storing the laminated dough product and baking the laminated dough product.

Mixing the Dough

The ingredients, specifically the flour, milk, sugar, salt, warm water, dry yeast and egg yolk are combined and mixed to form a laminated dough. In some embodiments, the ingredients may come pre-mixed in an anhydrous baking mix such that only the liquid ingredients need be added to the mix.

Mixing the Trans Fat Replacement System

The edible oil is added to the expanded, low-density carbohydrate and mixed at a reduced rate so as to not alter the random, porous structure of the expanded, low-density carbohydrate. As the mixing proceeds, the edible oil is entrapped within the random, porous structure of the expanded, low-density carbohydrate. Depending upon the characteristics of the selected expanded, low-density carbohydrate and the proportions of edible oil to expanded, low-density carbohydrate, the trans fat replacement system can have a consistency ranging from a powder to a paste. The trans fat replacement system preferably has a paste or butter-like consistency when used in preparing the laminated dough product. The trans fat replacement system can then be added to the dough in place of the required fat, for example the butter and/or margarine. In the case of a laminated dough product, the trans fat replacement system can be used in both the dough preparation as well as the dough sheeting as described below.

Sheeting the Trans Fat Replacement System

The dough is put through a sheet 3 to 4 times, until the dough length is three times greater than the length of the fat sheet. The fat sheet is placed in the center of the dough sheet. The ends of the dough sheet are folded over the fat sheet whereby the ends are pinched together such to prevent fat from extruding out of the dough. The dough sheet is then folded to get 16 layers.

Canning the Laminated Dough Product

The layered sheet is placed onto a table whereby it is cut into long strips. Each strip has a length of 12 inches and weighs approximately 242 g. Any excess dough is trimmed from the strips until the desired weight is reached. Each strip is then scored, sprayed with oil and rolled such that the "rolls" can be packaged into a can.

Proofing and Storing the Laminated Dough Product

Following loading, the cans are stored for twenty-four hours at 60° F. at which point the cans are placed in a refrigerator at 45° F. at which point the cans are stored until baking.

Baking the Laminated Dough Product

The laminated dough portions are separated and placed on a baking sheet. The laminated dough portions are baked at a temperature of 375° F. for 11 minutes or until the exterior of the croissant turns brown.

In comparing the croissants prepared with the trans fat replacement system of the invention with the traditionally prepared croissant, no significant differences were noted in taste, appearance or texture between the three croissants. The fat content for each of the three croissants is shown in Table 3 below.

TABLE 3

Fat Content of Croissants

| Croissant Sample | Fat Type | Total Fat (g) | Sat. Fat (g) | Trans Fat (g) | Saturated + Trans (g) |
| --- | --- | --- | --- | --- | --- |
| 1 | Trans Fat Replacement System (Table 1) | 2.0 | 0.4 | 0.3 | 0.7 |
| 2 | Trans Fat Replacement System (Table 2) | 2.0 | 0.4 | 0.3 | 0.7 |
| 3 | Partially Hydrogenated Shortening | 2.5 | 0.5 | 1.0 | 1.5 |

As shown in Table 3, the trans fat levels of the croissants prepared with representative embodiments of the trans fat replacement system of the invention had a 70% reduction in the amount of trans fats present in the final baked croissant as compared to the traditionally prepared croissant while presenting virtually the same experience, for example appearance and taste, as the croissant made with traditional shortening.

EXAMPLE 2

In another representative embodiment, the trans fat replacement system can be used to eliminate the presence of trans fats when preparing baked goods. For instance, the trans fat replacement system can be used to make baked goods that can be labelled as being "trans-fat free." A trans fat replacement system used in preparing trans-fat free baked goods fully replaces the use of traditional solid fats having trans fats, for example, shortenings, including animal fats such as lards, butter and hydrogenated vegetable oils such as margarine, with trans-fat free edible oils. A formulation for eliminating the presence of trans fats in a baked good is shown in Table 4. One representative application for the formulation contained in Table 3 is as a trans fat replacement system in typical roll in fat application such as preparing biscuits or croissants as described above.

TABLE 4

Trans Fat Replacement System for Elimination of Trans Fats in Baked Goods

| Fat Replacement Formulation | Percentage |
| --- | --- |
| Maltodextrin | 15% |
| Canola Oil | 55% |
| Partially Hydrogenated Shortening | 25% |

It will thus be seen according to the invention a highly advantageous trans fat replacement system for reducing or eliminated the presence of trans fats in baked goods has been provided. While the invention has been described with respect to the preparation and baking of laminated dough products, it is to be understood that the invention can be successfully practiced with respect to alternative baking products in which traditional fats are used and that would similarly benefit from a reduction or elimination of trans fat content. For example, the trans fat replacement system can be used in preparing baked products from developed dough, underdeveloped dough, proofed dough, unproofed dough or cookie dough. In another alternative embodiment, the trans fat replacement system of the invention can be incorporated into substantially anhydrous or dry baking mixes having from about 0% to about 8% moisture content on weight to weight basis requiring the addition of liquids such as water or milk to form a baking dough.

While the invention has been described in connection with what is presently considered to be the most practical embodiments, it will be apparent to those of ordinary skill in the art that the invention is not to be limited to the disclosed embodiments, that many modifications and equivalent arrangements may be made thereof within the scope of the invention, which scope is to be accorded the broadest interpretation of the appended claims so as to encompass all equivalent structures and products.

What is claimed:

1. An anhydrous trans fat replacement system for a farinaceous food product comprising:
    an expanded, low-density carbohydrate; and
    at least one edible oil,
    wherein the at least one edible oil is physically entrained within the expanded, low-density carbohydrate at a ratio of at least one part edible oil to one part expanded, low-density carbohydrate to form an anhydrous trans fat composition that can be used to replace saturated fats in a food product.

2. The trans fat replacement system of claim 1 wherein the expanded, low-density carbohydrate has a bulk density from about 0.05 to about 0.4 g/cc.

3. The trans fat replacement system of claim 1, wherein the expanded low-density carbohydrate is selected from the group consisting of a dextrin, a starch, a cellulose and a gum.

4. The trans fat replacement system of claim 3, wherein the expanded low-density carbohydrate is a maltodextrin.

5. The trans fat replacement system of claim 1, wherein the edible oil is selected from the group consisting of an animal oil, a marine oil, a dairy oil, a fruit oil, a vegetable oil, a tree nut oil and combinations thereof.

6. The trans fat replacement system of claim 1, further comprising an edible fat.

7. The trans fat replacement system of claim 6, wherein the edible fat is selected from the group consisting of shortening, butter, lard and margarine.

8. The trans fat replacement system of claim 1, wherein the ratio of edible oil to expanded low-density carbohydrate is at least six parts edible oil to one part expanded low-density carbohydrate such that said trans fat replacement system is a spreadable paste.

9. A method of making an anhydrous trans fat replacement system comprising:
    mixing an expanded, low-density carbohydrate and at least one edible oil at a ratio of at least one part edible oil to one part expanded, low-density carbohydrate to entrain said oil within the expanded, low-density carbohydrate so as to form an anhydrous trans fat replacement system that can be used in a food product to replace saturated fat.

10. The method of claim 9, wherein the mixing rate is conducted at a mixing rate that maintains a porous structure of the expanded, low-density carbohydrate.

11. The method of claim 9, further comprising liquefying an edible fat wherein the edible fat is added to the at least one edible oil.

12. A method of using an anhydrous trans fat replacement system in a farinaceous food product comprising:
    mixing an expanded, low-density carbohydrate and at least one edible oil at a ratio of at least one part edible oil to one part expanded, low-density carbohydrate to form an anhydrous trans fat replacement system; and
    adding the trans fat replacement system to an amount of flour, an amount of sugar and a flavoring to form a dough composition.

13. The method of claim 12, further comprising baking the dough composition.

14. The method of claim 12, further comprising pre-mixing the flour, the sugar and the flavoring to form a baking kit.

15. A method of using an anhydrous trans fat replacement system in an anhydrous baking mix comprising:
    mixing an expanded, low-density carbohydrate and at least one edible oil at a ratio of at least one part edible oil to one part expanded, low-density carbohydrate to form an anhydrous trans fat replacement system;
    adding the anhydrous trans fat replacement system to an amount of flour, an amount of sugar and a flavoring to form an anhydrous baking mix; and
    adding a liquid to the anhydrous baking mix.

* * * * *